(12) United States Patent
Brodi, Jr. et al.

(10) Patent No.: US 6,838,027 B2
(45) Date of Patent: Jan. 4, 2005

(54) METHOD OF MAKING AN INTERIOR TRIM PANEL

(75) Inventors: James Joseph Brodi, Jr., Sterling Heights, MI (US); Suresh Deepchand Shah, Troy, MI (US); Carl Henry Visconti, Clarkston, MI (US); Michael William Jary, Farmington Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 340 days.

(21) Appl. No.: 09/805,684

(22) Filed: Nov. 30, 2000

(65) Prior Publication Data

US 2001/0028131 A1 Oct. 11, 2001

Related U.S. Application Data

(60) Provisional application No. 60/173,636, filed on Dec. 30, 1999.

(51) Int. Cl.[7] .......................... B29C 45/14; B29C 47/02; B29C 69/02
(52) U.S. Cl. ........................ 264/138; 264/255; 264/275; 264/247; 264/250
(58) Field of Search ................................ 264/255, 138, 264/247, 259, 275, 250

(56) References Cited

U.S. PATENT DOCUMENTS

| | | | |
|---|---|---|---|
| 3,808,743 A | 5/1974 | Renner et al. | |
| 3,964,208 A | 6/1976 | Renner et al. | |
| 3,989,275 A | 11/1976 | Finch et al. | |
| 4,411,944 A | 10/1983 | Moore | |
| 4,519,964 A | 5/1985 | Rosen | |
| 4,549,761 A | 10/1985 | Lee et al. | |
| 4,562,025 A | 12/1985 | Gray | |
| 4,662,115 A | 5/1987 | Ohya et al. | |
| 4,751,249 A | 6/1988 | Wycech | |
| 4,766,025 A | 8/1988 | Sanok et al. | |
| 4,783,114 A | 11/1988 | Welch | |
| 4,800,681 A | 1/1989 | Skillen et al. | |
| 4,806,094 A | 2/1989 | Rhodes, Jr. et al. | |
| 4,810,452 A | 3/1989 | Taillefert et al. | |
| 4,827,671 A | 5/1989 | Herringshaw et al. | |
| 4,845,894 A | 7/1989 | Herringshaw et al. | |
| 4,853,995 A | 8/1989 | Bethell et al. | |
| 4,873,045 A | * 10/1989 | Fujita et al. | ................. 264/259 |
| 5,004,292 A | 4/1991 | Horne | |
| 5,040,335 A | 8/1991 | Grimes | |
| 5,053,179 A | * 10/1991 | Masui et al. | ................. 264/257 |
| 5,091,031 A | 2/1992 | Strapazzini | |
| 5,095,659 A | 3/1992 | Benoit et al. | |
| 5,102,163 A | 4/1992 | Ishikawa | |
| 5,143,667 A | 9/1992 | Matsuura et al. | |
| 5,224,299 A | 7/1993 | Abe | |

(List continued on next page.)

FOREIGN PATENT DOCUMENTS

| | | |
|---|---|---|
| DE | 19825844 | 12/1999 |
| EP | 0734832 | 10/1996 |
| FR | 2744947 | 8/1997 |
| JP | 54-9628 | 4/1979 |
| JP | 57-199633 | 12/1982 |
| JP | 5-147121 | 5/1993 |
| JP | 08142083 | 6/1996 |
| JP | 10 109327 | 4/1998 |
| WO | 96 25282 | 8/1996 |
| WO | 9800279 | 1/1998 |

Primary Examiner—Edmund H. Lee
(74) Attorney, Agent, or Firm—Scott A. McBain

(57) ABSTRACT

A method of making an interior trim panel for attachment to structure of a vehicle includes the steps of loading a trim blank into a cavity of a first side of a mold and depositing a molten thermoplastic material onto a core on the first side of the mold. The method also includes the steps of closing the mold, moving the slide in a channel of the core, and injecting a molten thermoplastic material into a second side of the mold to form the interior trim panel.

11 Claims, 3 Drawing Sheets

U.S. PATENT DOCUMENTS

| | | | |
|---|---|---|---|
| 5,271,885 A | | 12/1993 | Denker et al. |
| 5,306,068 A | | 4/1994 | Nakae et al. |
| 5,328,651 A | | 7/1994 | Gallagher et al. |
| 5,340,425 A | | 8/1994 | Strapazzini |
| 5,387,390 A | | 2/1995 | Kornylo |
| 5,411,688 A | | 5/1995 | Morrison et al. |
| 5,418,032 A | | 5/1995 | Martin |
| 5,419,606 A | | 5/1995 | Hull et al. |
| 5,429,786 A | * | 7/1995 | Jogan et al. ............... 264/255 |
| 5,462,482 A | | 10/1995 | Grimes |
| 5,474,841 A | | 12/1995 | Matsuki et al. |
| 5,482,344 A | | 1/1996 | Walker et al. |
| 5,535,553 A | | 7/1996 | Staser et al. |
| 5,535,571 A | | 7/1996 | Nichols |
| 5,536,351 A | | 7/1996 | Rheinlander et al. |
| 5,580,119 A | | 12/1996 | Uchida et al. |
| 5,580,501 A | | 12/1996 | Gallagher et al. |
| 5,582,789 A | | 12/1996 | Stein et al. |
| 5,595,415 A | | 1/1997 | Beaulat |
| 5,603,548 A | | 2/1997 | Gandhi et al. |
| 5,618,477 A | | 4/1997 | Suzuki |
| 5,626,382 A | | 5/1997 | Johnson et al. |
| 5,695,865 A | | 12/1997 | Shimizu |
| 5,709,828 A | | 1/1998 | Bemis et al. |
| 5,759,464 A | * | 6/1998 | Matsumoto et al. ......... 264/138 |
| 5,762,394 A | | 6/1998 | Salmonowicz et al. |
| 5,776,509 A | * | 7/1998 | Ota et al. ................. 425/111 |
| 5,866,232 A | | 2/1999 | Gatzmanga |
| 5,904,002 A | | 5/1999 | Emerling et al. |
| 5,924,760 A | | 7/1999 | Krajewski et al. |
| 5,928,776 A | | 7/1999 | Shioya et al. |
| 5,947,547 A | | 9/1999 | Deeks et al. |
| 6,027,678 A | * | 2/2000 | Rehm et al. ............... 264/255 |
| 6,063,460 A | | 5/2000 | Souders et al. |
| 6,149,224 A | | 11/2000 | Tiberia et al. |
| 6,174,396 B1 | | 1/2001 | Casteel et al. |
| 6,183,038 B1 | | 2/2001 | Hansen et al. |
| 6,196,607 B1 | | 3/2001 | Gulisano |
| 6,197,403 B1 | | 3/2001 | Brown et al. |
| 6,422,640 B2 | | 7/2002 | Whitehead et al. |
| 2001/0025456 A1 | | 10/2001 | Furuyama et al. |

* cited by examiner

METHOD OF MAKING AN INTERIOR TRIM PANEL

CROSS-REFERENCE TO RELATED APPLICATION(S)

The present invention claims the priority date of now abandoned U.S. Provisional Patent Application Ser. No. 60/173,636, filed Dec. 30, 1999.

TECHNICAL FIELD

The present invention relates generally to interior trim panels for vehicles and, more particularly, to a method of making an interior trim panel for a vehicle.

BACKGROUND OF THE INVENTION

It is known to provide an interior trim panel for a vehicle to present an aesthetically pleasing appearance in an occupant compartment of the vehicle. The interior trim panel typically includes a trim blank attached to a carrier or substrate by several different conventional processes including adhesives, heat staking, sonic welding, and fasteners. The interior trim panel may be mounted to structure of the vehicle such as an inner door panel of a door for the vehicle by suitable means such as fasteners.

Although the above interior trim panel and method of making has worked, it is desirable to reduce the costs associated with the manufacture of an interior trim panel. It is also desirable to provide an interior trim panel with reduced mass, tooling, and equipment per vehicle. Therefore, there is a need in the art to provide an improved method of making an interior trim panel for a vehicle.

SUMMARY OF THE INVENTION

It is, therefore, one object of the present invention to provide a new method of making an interior trim panel for a vehicle.

It is another object of the present invention to provide a method of making an interior trim panel that combines extrusion deposition and injection molding into a single step.

It is yet another object of the present invention to provide a method of making a door trim panel that has less cost.

To achieve the foregoing objects, the present invention is a method of making an interior trim panel for attachment to structure of a vehicle. The method includes the steps of loading a trim blank into a cavity of a first side of a mold and depositing a molten thermoplastic material onto a core on the first side of the mold. The method also includes the steps of closing the mold, moving the slide in a channel of the core, and injecting a molten thermoplastic material into a second side of the mold to form the interior trim panel.

One advantage of the present invention is that an improved method of making an interior trim panel is provided for a vehicle. Another advantage of the present invention is that the method of making the interior trim panel is a lean manufacturing method with in-mold lamination for obtaining a trim panel which is partially clad with trim while another area is grained, molded in color (class A interior surface) in a single step process using the same equipment. Yet another advantage of the present invention is that the method of making the interior trim panel reduces cost as opposed to a two-piece construction and by using a lower-cost, uncolored, material for Side A, including the possible use of multi-color regrind. Still another advantage of the present invention is that the method of making the interior trim panel reduces material cost by using low cost material behind the trim cover area and more structural material at a lower cost. A further advantage of the present invention is that the method of making the interior trim panel provides good surface appearance at a junction of the trim and straight injection molded surface. Yet a further advantage of the present invention is that the method of making the interior trim panel provides ease of processibility and design flexibility by providing an opportunity to design trim panels with less cost.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
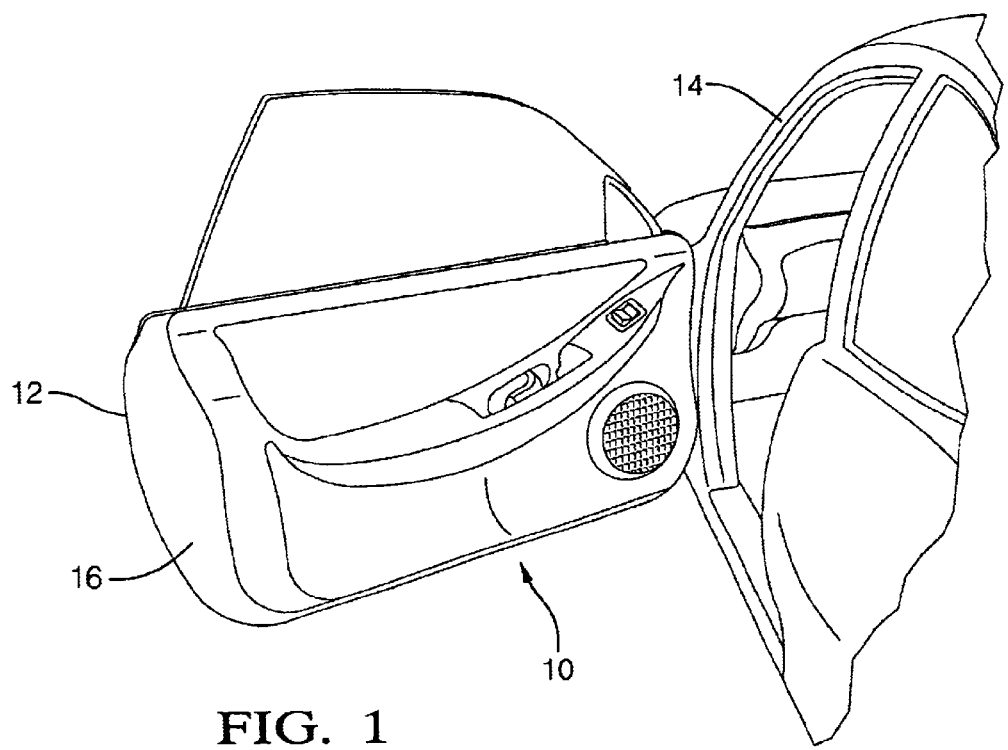
FIG. 1 is an interior trim panel made by a method, according to the present invention, illustrated in operational relationship with a vehicle.

Referring to the drawings and in particular FIG. 1, one embodiment of an interior trim panel 10, according to the present invention, is shown mounted to structure such as a door 12 of a vehicle 14 such as an automotive vehicle. It should be appreciated that, in this example, the interior trim panel 10 is mounted to an inner panel 16 of the door 12. It should also be appreciated that the interior trim panel 10 may be mounted to other structure or panels of the vehicle 14.

Figure 7:
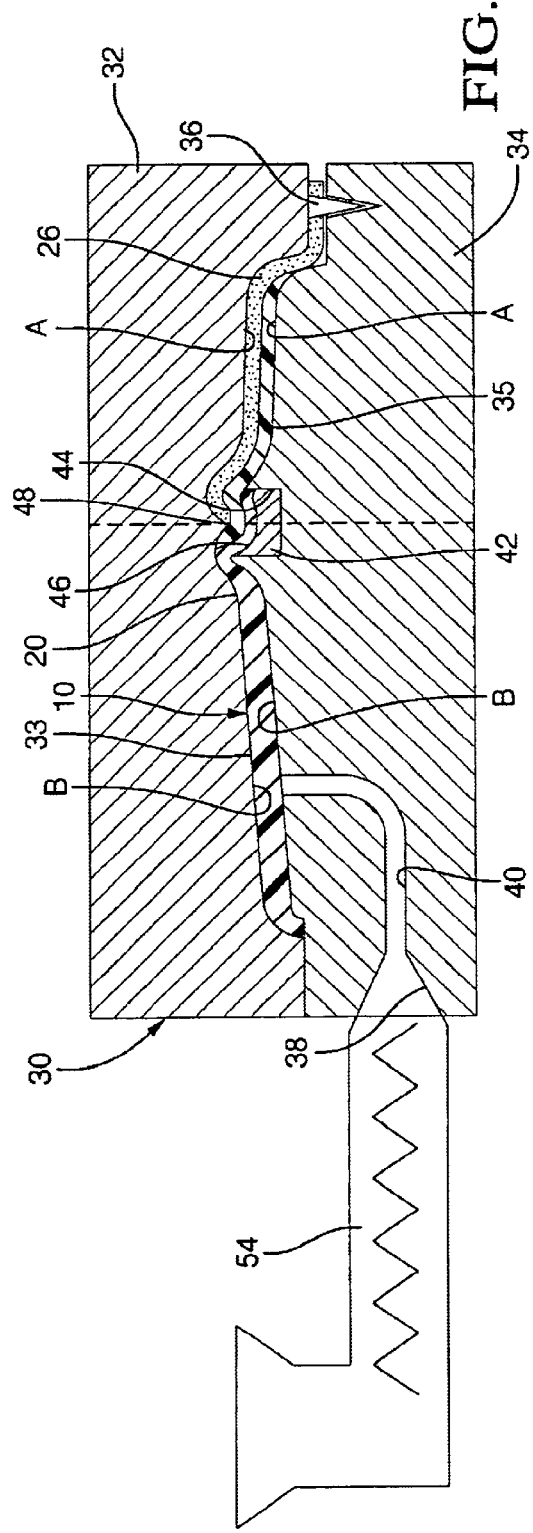
FIG. 7 is a fragmentary side view of the mold of FIG. 2 illustrated in a closed position for molding of side B of the interior trim panel.

Referring to FIGS. 1 and 7, the interior trim panel 10 includes a carrier 18 extending longitudinally and vertically and having a generally rectangular shape. The carrier 18 is made of a thermoplastic material such as polypropylene. The carrier 18 is formed by a method, according to the present invention, to be described. The carrier 18 has an inner side 20 and an outer side 22. The carrier 18 has a projection 24 formed adjacent an edge of a trim blank 26 to be described. The outer side 22 is attached to the inner panel 16 of the door 12 by suitable means such as fasteners (not shown). It should be appreciated that the carrier 18 is partially clad with the trim blank 26 to be described for the interior trim panel 10.

The interior trim panel 10 also includes a trim blank 26 incorporated or integrated into the carrier 18. The trim blank 26 extends longitudinally and vertically. The trim blank 26 is made of a fabric, cloth, vinyl, TPQ (Thermoplastic Polyolifin), leather, or carpet material. Preferably, the trim blank 26 is pre-cut or pre-blanked by a conventional process known in the art. The trim blank 26 is disposed over and bonded to the inner side 20 of the carrier 18 by melting and fusion of the plastic material of the carrier 18. It should be appreciated that the trim blank 26 covers only a portion on one side of the projection 24 of the carrier 18. It should also be appreciated that the trim blank 26 is a separate piece or component.

Figure 2:
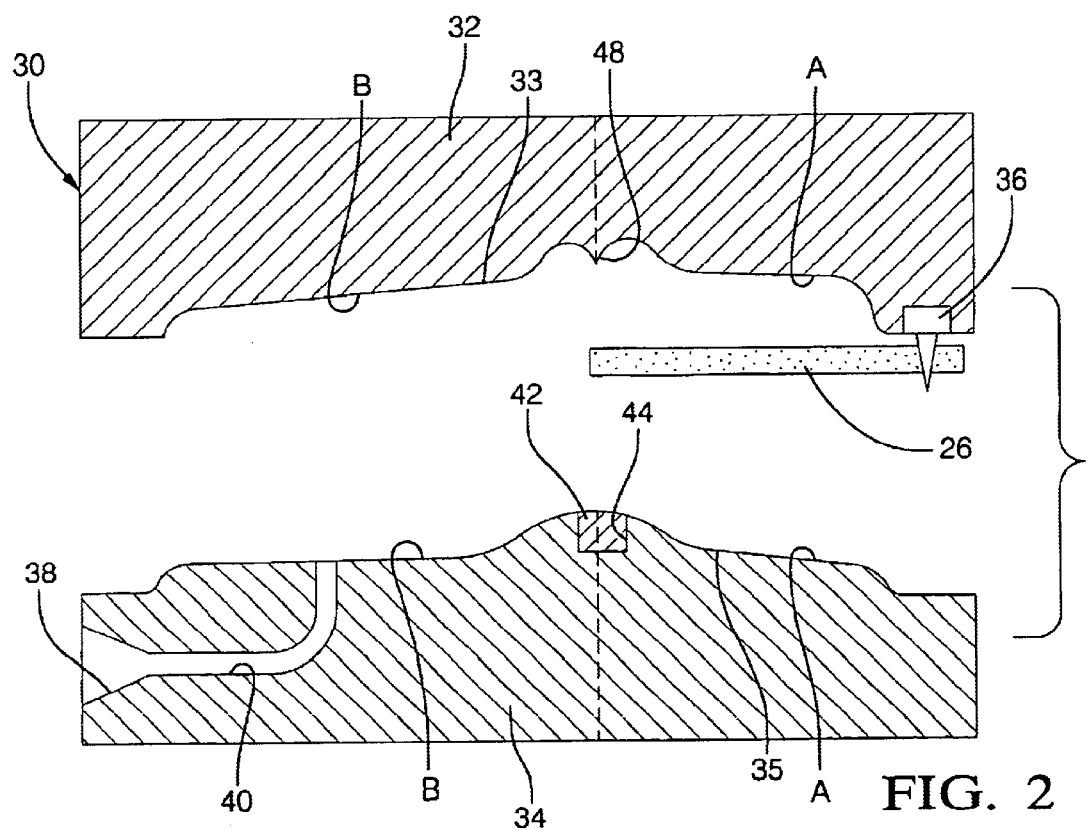
FIG. 2 is a fragmentary side view of a mold used in a method, according to the present invention, of making the interior trim panel of FIG. 1 illustrated in an open position.
Figure 3:
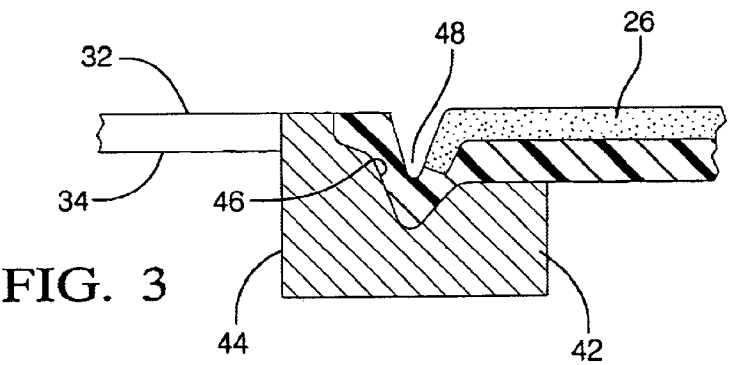
FIG. 3 is a partial fragmentary view of a movable slide of the mold of FIG. 2 illustrated in a first position with the mold closed.
Figure 4:
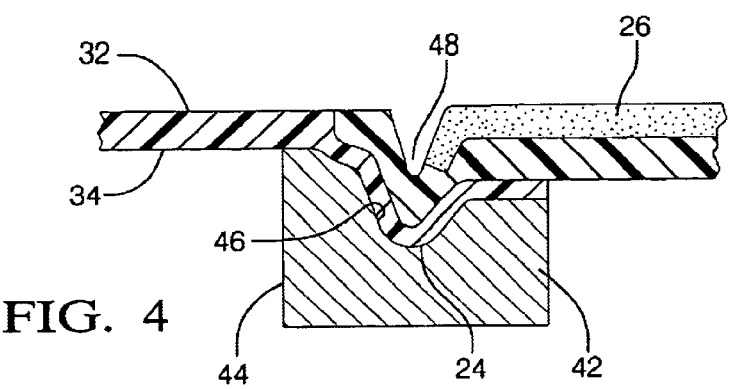
FIG. 4 is a partial fragmentary view of a movable slide of the mold of FIG. 2 illustrated in a second position with the mold closed.

Referring to FIGS. 2 through 7, a method, according to the present invention, of making the interior trim panel 10 is disclosed. The method involves combining extrusion deposition compression molding (EDCM) with injection molding or injection-compression molding (ICM). As illustrated, a mold, generally indicated at 30, includes a first half mold 32 and a second half mold 34. The first half mold 32 is the mold cavity and the second half mold 34 is the mold core. The first half mold 32 has a cavity portion 33 and the second half mold 34 has a core portion 35. The first half mold 32 and second half mold 34 could be mounted to platens (not shown) of a press (not shown) such as a vertical molding press with sufficient tonnage to accomplish the method to be described with the cavity up or cavity down. The first half mold 32 has a trim loading system 36 such as a slip device or pin frame, preferably a three-sided pin frame. The trim loading system 36 accommodates loading of the trim blank 26 as part of an insert molding process and may be a slip frame or manual loading system. The second half mold 34 has an inlet 38 and a passage 40 for allowing a fluid material such as molten plastic or plastic melt to enter between the first and second half molds 32 and 34. The mold 30 also includes a movable slide 42 movable along a channel 44 in the second half mold 34 between an extended position as illustrated in FIG. 3 and a retracted position as illustrated in FIG. 4. The slide 42 has a groove or recess 46 therein for a function to be described. The mold 30 further includes a blade 48 extending along the first half mold 32 and cooperating with the recess 46 of the slide 42. It should be appreciated that, for purposes of description, the mold 30 will have two sides or portions A and B on the first half mold 32 and second half mold 34. It should also be appreciated that the side A will be the area of the interior trim panel 10 to be covered by the trim blank 26 and side B will be the area of the interior trim panel 10 to have an interior "Class A" surface.

Figure 5:
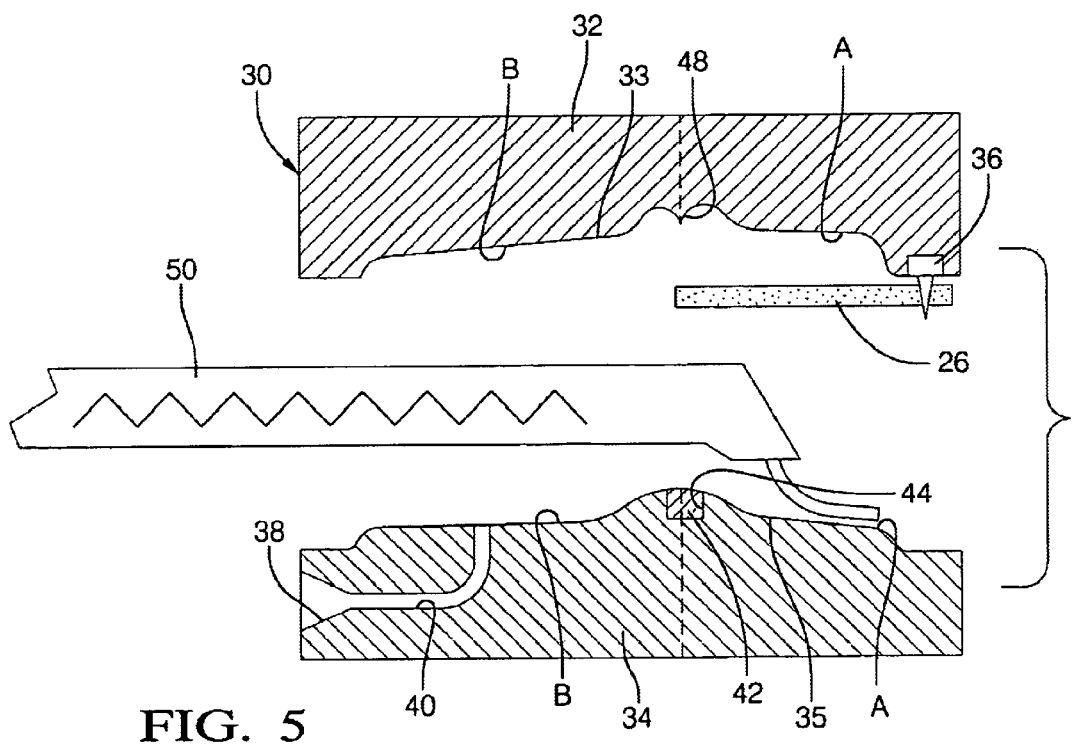
FIG. 5 is a fragmentary side view of the mold of FIG. 2 illustrated in an open position.
Figure 6:
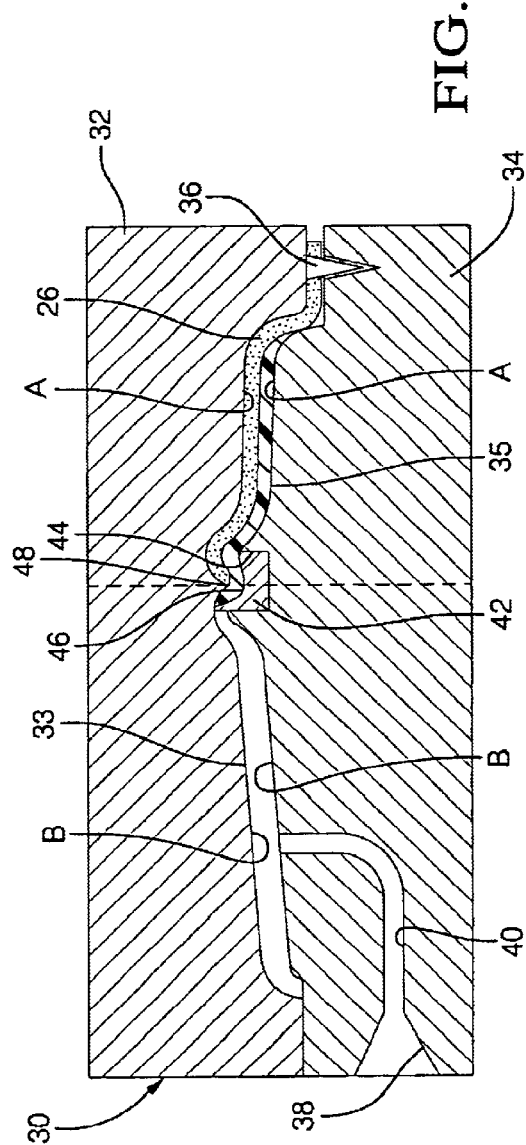
FIG. 6 is a fragmentary side view of the mold of FIG. 2 illustrated in a closed position for molding of side A of the interior trim panel.

The method, according to the present invention, includes the step of loading the trim blank 26 onto the cavity portion 33 of the first half mold 32 on side A as illustrated in FIG. 2. The trim blank 26 can be unformed or preformed using known thermoforming processes. The method includes the step of moving the slide 42 by extending the slide 42 into the cavity area, separating side A from side B in the mold 30 as illustrated in FIG. 3. The method includes the step of providing a ECDM deposition unit 50 with an extrusion head with X-Y-Z axis positioning capability and depositing by extruding a plastic melt as a strand or a sheet in the mold area or core portion 35 corresponding to side A of the finished interior trim panel 10 onto the second half mold 44 as illustrated in FIG. 5. The method includes the step of closing the mold 30 and causing the plastic melt to flow and fill side A of the mold cavity and resulting in adhesion to the back of the trim blank 26 while it is formed into the shape of the mold cavity (if not pre-formed) as illustrated in FIG. 6. The blade 48 is disposed in the recess 46 of the slide 42 and prevents overflow of the plastic melt to form a portion of the projection 24. It should be appreciated that the projection 24 will provide a sharp distinction of the trim blank 26 adjacent to the molded-in-color show surface of the carrier 18.

The method includes the step of providing a fixed injection unit 54, positioned to inject molten plastic directly into the inlet or sprue 38 on the side of the second half mold 34. The method includes the step of moving the slide 42 by retracting the slide 42 away from the blade 48 as illustrated in FIG. 4. The method includes the step of injecting plastic melt from the fixed injection unit 54, which flows through the passage 40 into the mold cavity on side B, filling side B as illustrated in FIG. 7. The method includes cooling the mold 30 for a required cooling time and opening the mold 30 and removing the partially clad, molded interior trim panel 10.

Alternatively, as the movable slide 42 between side A and side B is retracted, the mold 30 is opened slightly and plastic melt is injected from the fixed injection unit 54, filling side B of the panel. The mold 30 is then fully closed, causing the molding plastic to completely fill side B of the mold cavity. It should be appreciated that these steps are similar to injection compression molding (ICM).

Accordingly, the method provides the combination of extrusion deposition molding and injection molding in a single manufacturing step to make a trim panel, which is partially covered, and partially exposed having a class A interior surface. The method also prevents overflow of the melt during EDCM step and to have sharp distinction of the trim material adjacent to the molded-in-color show surface.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making an interior trim panel for a vehicle, said method comprising the steps of:

providing a mold having a first half and a second half;

providing a trim loading system on the first half;

loading a trim blank into the trim loading system;

moving a slide having a recess to an extended position on the second half to divide the second half into two sides;

extruding a molten first thermoplastic material onto the side of the second half that is opposite the trim blank;

closing the mold to bond the first thermoplastic material to the trim blank to form a cavity on the side of the second half not containing the first thermoplastic material and trim blank and disposing a blade on the first half into the recess of the extended slide;

moving the slide to a retracted position; and injecting a molten second thermoplastic material into the cavity between the first half and the second half to bond the second thermoplastic material to the first thermoplastic material to form the interior trim panel.

2. A method as set forth in claim 1 wherein said step of injecting comprises providing an injection unit for injecting molten plastic into the mold.

3. A method as set forth in claim 2 including the step of cooling the interior trim panel.

4. A method as set forth in claim 2 including the step of opening the mold.

5. A method as set forth in claim 4 including the step of removing the interior trim panel from the mold.

6. A method as set forth in claim 1 including the step of pre-cutting the trim blank.

7. A method as set forth in claim 1 including the step of starting one step before a previous step has been completed.

8. A method of making an interior trim panel for an inner panel of a vehicle, said method comprising the steps of:

providing a mold having a first half and a second half;

providing a trim loading system on the first half;

loading a trim blank into the trim loading system;

moving a slide having a recess to an extended position on the second half to divide the second half into two sides;

extruding a molten first thermoplastic material onto the side of the second half that is opposite the trim blank;

closing the mold to bond the first thermoplastic material to the trim blank to form a cavity on the side of the second half not containing the first thermoplastic material and trim blank and disposing a blade on the first half into the recess of the extended slide to form a first portion of the interior trim panel;

moving the slide to a retracted position; and injecting a molten second thermoplastic material into the mold and forcing the molten second plastic material into a cavity between the first half and the second half to bond the second thermoplastic material to the first thermoplastic material to form a second portion of the interior trim panel.

9. A method as set forth in claim 8 including the step of opening the mold.

10. A method as set forth in claim 9 including the step of removing the interior trim panel from the mold.

11. A method of making a door trim panel for attachment to an inner panel of a door of a vehicle, said method comprising the steps of:

providing a mold having a first half and a second half;

providing a pin frame on the first half;

loading a trim blank into the pin frame;

extending a slide having a recess to an extended position on the second half to divide the second half into two sides;

extruding a molten first thermoplastic material onto the side of the second half that is opposite the trim blank;

closing the mold to bond the first thermoplastic material to the trim blank to form a cavity on the side of the second half not containing the first thermoplastic material and trim blank and disposing a blade on the first half into the recess of the extended slide to form a first portion of the door trim panel;

retracting the slide to a retracted position; and injecting a molten second thermoplastic material into the cavity between the first half and the second half and forcing the molten second thermoplastic material into the cavity to bond the second thermoplastic material to the first thermoplastic material to form a second portion of the door trim panel.

* * * * *